(No Model.)
G. W. SMITH.
VEHICLE AXLE AND BOX.
No. 488,486.  Patented Dec. 20, 1892.
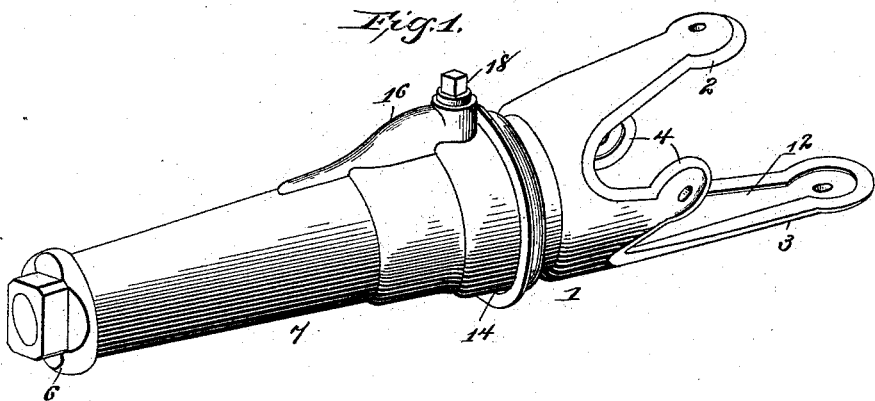
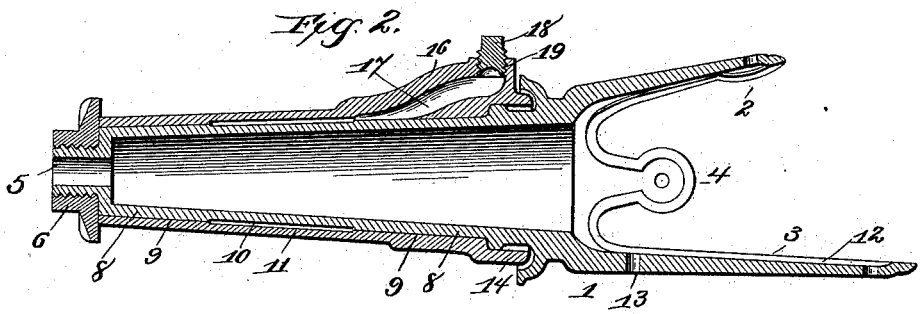
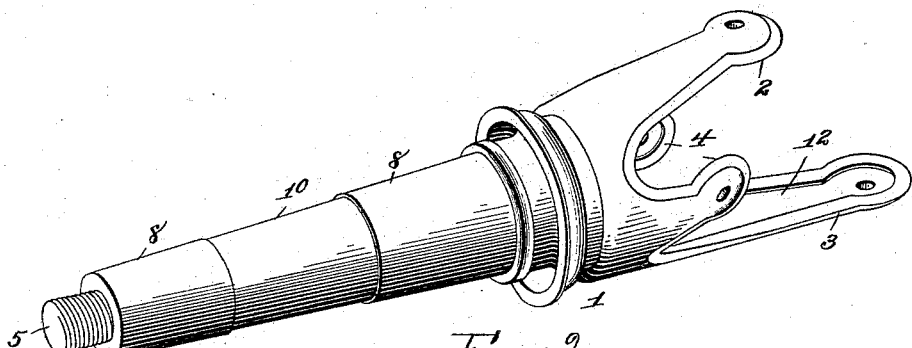
Witnesses  Inventor
George W. Smith
By his Attorneys,

United States Patent Office.

GEORGE WASHINGTON SMITH, OF DARLINGTON, WISCONSIN, ASSIGNOR OF ONE-HALF TO EDWARD C. KING, OF SAME PLACE.

VEHICLE AXLE AND BOX.

SPECIFICATION forming part of Letters Patent No. 488,486, dated December 20, 1892.

Application filed July 25, 1892. Serial No. 441,167. (No model.)

*To all whom it may concern:*

Be it known that I, GEORGE WASHINGTON SMITH, a citizen of the United States, residing at Darlington, in the county of Lafayette and State of Wisconsin, have invented a new and useful Vehicle Axle and Box, of which the following is a specification.

The invention relates to improvements in spindles.

The object of the present invention is to improve the construction of skeins and axle boxes, to prevent dampness and dry rot, and to arrange the oil cup or cell so that it will not interfere with the hub of a wheel or the removal of an axle box therefrom.

The invention consists in the construction and novel combination and arrangement of parts hereinafter fully described, illustrated in the accompanying drawings and pointed out in the claims hereto appended.

In the drawings—Figure 1 is a perspective view of an axle skein and box constructed in accordance with this invention. Fig. 2 is a longitudinal sectional view of the same. Fig. 3 is a perspective view of the axle skein.

Like numerals of reference indicate corresponding parts in all the figures of the drawings.

1 designates an axle skein constructed of malleable iron, and adapted to fit on an end of a wooden axle and provided with inwardly extending arms 2, 3 and 4, and having a spindle portion 5, the outer end of which is threaded and receives a nut 6, which secures an axle box 7 on the spindle portion. The spindle portions 5 and the interior of the axle box are provided with oppositely disposed end bearing portions 8 and 9, and arranged between the bearing portions are annular recesses 10 and 11, which when the parts are fitted together form an air chamber to lessen the friction by decreasing the bearing surface, and to prevent the parts becoming heated to such an extent as they would were the entire surface of the spindle portion of the skein in contact with the interior of the axle box.

The inner faces of the arms 2, 3 and 4 of the axle skein are recessed to form an air space 12 to prevent dampness and dry rot, and the lower arm 3 has an opening 13 communicating with the annular air space 12.

The inner end of the axle box is provided with an extension 14 which forms a sand band the edge of which is received within a concave annular sand band flange formed integral with the axle skein. A longitudinal axle box flange 16 which prevents the axle box turning within a hub, is made hollow to form an oil cell or cup 17, the outer terminus of which is arranged on the sand band so as not to interfere with the hub, and is threaded and provided with a plug 18. The plug 18 is provided in its lower end with an air recess or concavity 19, whereby when the plug 18 is screwed into the threaded opening of the oil cup or well, air will be compressed and will force the lubricant on the bearings of the spindle portions of the axle skein. The head of the skein is beveled at the edges of the arms to present a neat appearance, and in casting the skein the angles are filled with metal to prevent square shoulders, which are liable to crack when the metal is cooling, and by making the shoulders rounded, the liability to crack is greatly lessened. The opening or filling orifice of the oil well or cavity is arranged near the middle of the sand band, and the oil cell or cup extends longitudinally of the axle box and terminates at the middle of the inner bearing surface of the axle box.

It will be seen that the axle skein and box are strong and durable, that the parts are not liable to become heated, and that dampness and dry rot are prevented. It will also be apparent, that the oil cup or well does not interfere with the hub or with the insertion or the removal of the axle box therefrom, and that the flange which prevents the axle box turning in the hub is utilized for the formation of the oil cell or cup.

The thimble skein is adapted to extend sufficiently inward on the end of an axle to prevent the latter breaking at the usual point of breakage, which is just outside of the hound bolt. The inside of the arms are sufficiently wide to make a firm bearing, and they have a true line bearing with the inside of the narrow socket portion, thereby making it very easy to fit the skein on an axle. The top arm is sufficiently long to provide a heavy bearing and to locate the bolt hole over the heaviest portion of the axle. The side arms are short to carry the hound brace nearer the wheel than hertofore to provide a construction of great strength and durability.

What I claim is—

1. The combination of an axle box having a central annular recess and end bearings and having a hollow longitudinal flange forming an oil chamber terminating at its inner end at the annular recess, and an axle skein provided with end bearings and an annular recess corresponding with those of the axle box, substantially as described.

2. An axle skein provided at its inner end with securing arms and having their inner faces recessed to form an air chamber and provided with an opening communicating with the recess, substantially as and for the purpose described.

3. An axle box having a sand band extension and provided with a longitudinal flange having an opening or bore forming an oil cell the inner terminus of the ball being threaded and arranged on the sand band and the inner terminus being arranged with the axle box proper, in combination with a threaded plug screwing into the bore and provided in its lower end with an air recess, substantially as described.

In testimony that I claim the foregoing as my own I have hereto affixed my signature in the presence of two witnesses.

GEORGE WASHINGTON SMITH.

Witnesses:
N. WALTER BOWER,
EDWARD C. KING.